United States Patent [19]
Ortelli

[11] 3,828,808
[45] Aug. 13, 1974

[54] EXHAUST VALVE FOR INTERNAL COMBUSTION ENGINE

[75] Inventor: Aurelio Ortelli, Bologna, Italy

[73] Assignee: Riva Calzoni S.p.A., Milan, Italy

[22] Filed: Feb. 6, 1973

[21] Appl. No.: 330,151

[30] Foreign Application Priority Data
Feb. 28, 1972 Italy.................................. 21124/72

[52] U.S. Cl.................. 137/340, 251/229, 251/228, 251/231
[51] Int. Cl. .......................... F16k 31/44, F16k 1/16
[58] Field of Search ........ 137/340, 341; 251/84, 85, 251/86, 87, 88, 231, 232, 233, 234, 235, 228, 229

[56] References Cited
UNITED STATES PATENTS

| | | | |
|---|---|---|---|
| 1,211,452 | 1/1917 | Kersteter | 251/86 X |
| 1,588,752 | 6/1926 | Lang | 251/86 |
| 2,121,707 | 6/1938 | McGee | 251/86 X |
| 3,126,941 | 3/1964 | Mohr et al. | 137/340 X |
| 3,306,571 | 2/1967 | Bussi et al. | 251/231 X |
| 3,364,944 | 1/1968 | McGay | 251/86 X |
| 3,511,262 | 5/1970 | Vietorisz | 137/340 X |
| 3,721,424 | 3/1973 | Vanderinden | 251/86 X |
| 3,727,880 | 4/1973 | Stock | 251/85 |

Primary Examiner—Alan Cohan
Attorney, Agent, or Firm—Sughrue, Rothwell, Mion, Zinn & Macpeak

[57] ABSTRACT

A valve for sealing the exhaust passage of an internal combustion engine to prevent the ingress of fluids under pressure when the engine is not working. The valve comprises an annular valve seat closable by a circular valve shutter disc or plate which is carried at the ends of two pivoted arms. The valve shutter plate is pivoted with respect to the two arms and provided with a mechanism for turning the plate with respect to the arms automatically as the valve is opened, to turn the operating face of the shutter plate away from the stream of hot exhaust gases which pass through the port surrounded by the annular valve seat, when the engine is running. Means for cooling the operating face of the shutter plate while the engine is running are also provided.

4 Claims, 3 Drawing Figures

Fig_1

EXHAUST VALVE FOR INTERNAL COMBUSTION ENGINE

BACKGROUND OF THE INVENTION

The present invention relates to a valve for securely closing the exhaust passages of an internal combustion engine in the presence of fluids which could, under pressure, enter the exhaust passage at some point downstream from the valve (with respect to normal gas flow).

Known valves for this purpose have been formed by a fixed valve seat comprising an annular element surrounding the outlet of the exhaust passage onto which a valve shutter in the form of a small plate is pressed when the valve is closed.

The shutter plate is carried at one end of an arm, the other end of which is pivoted at a position spaced from the fixed valve seat.

In the open position the shutter plate is raised from the fixed valve seat by rotation of the pivoted arm through an angle of about 90° from the closed position, effected by means known per se.

The valve is open during operation of the engine, and thus the parts of the valve are subjected to heat and the corrosive effect of impurities in the exhaust gases from the engine, which pass through the valve. The valve seat is cooled by sprinkling with water, through suitable nozzles to keep it relatively cool, and to prevent the formation of deposits from the impurities of the exhaust gases, which would impair the quality of the seal of the valve when closed.

However, in the type of valve described above certain practical disadvantages concerning the effectiveness of the seal obtained when the valve is closed have been found. Although the fixed valve seat is continually washed over and cooled with water, the shutter plate is not, and the face thereof which cooperates with the valve seat, and which, in general, is provided with some form of seal, faces towards the exhaust gases and is therefore subjected to the deleterious effects both of the high temperature of the gases and to the corrosive action of the impurities and partly burned particles which may become deposited thereupon.

OBJECTS OF THE INVENTION

The object of the invention is to provide a valve of the type described above, in which the valve shutter plate is, at least to some extent, protected from the above mentioned deleterious effects so that a satisfactory seal with the annular valve seat can be more reliably provided thereby.

SUMMARY OF THE INVENTION

According to the present invention a valve for sealing an exhaust passage of an internal combustion engine, of the type comprising an annular fixed valve seat, and a valve shutter plate carried at the end of an arm the other end of which is pivotally mounted to a support spaced from the fixed valve seat, the valve shutter plate being moved towards or away from engagement with the valve seat by rotation of the said arm between two positions separated by about 90°, is characterised in that the valve shutter plate is rotatably mounted at the end of two pivoted arms and is provided with means for cooperating with a fixed element spaced from the shutter plate which, during rotation of the pivoted arms from one of the said two positions to the other cause rotation of the said shutter plate through approximately 180° with respect to the said pivoted arms.

Various other features and advantages of the invention will become apparent during the course of the following description of a preferred embodiment which is provided purely by way of non-restrictive example.

DESCRIPTION OF THE PREFERRED EMBODIMENT

Figure 1:
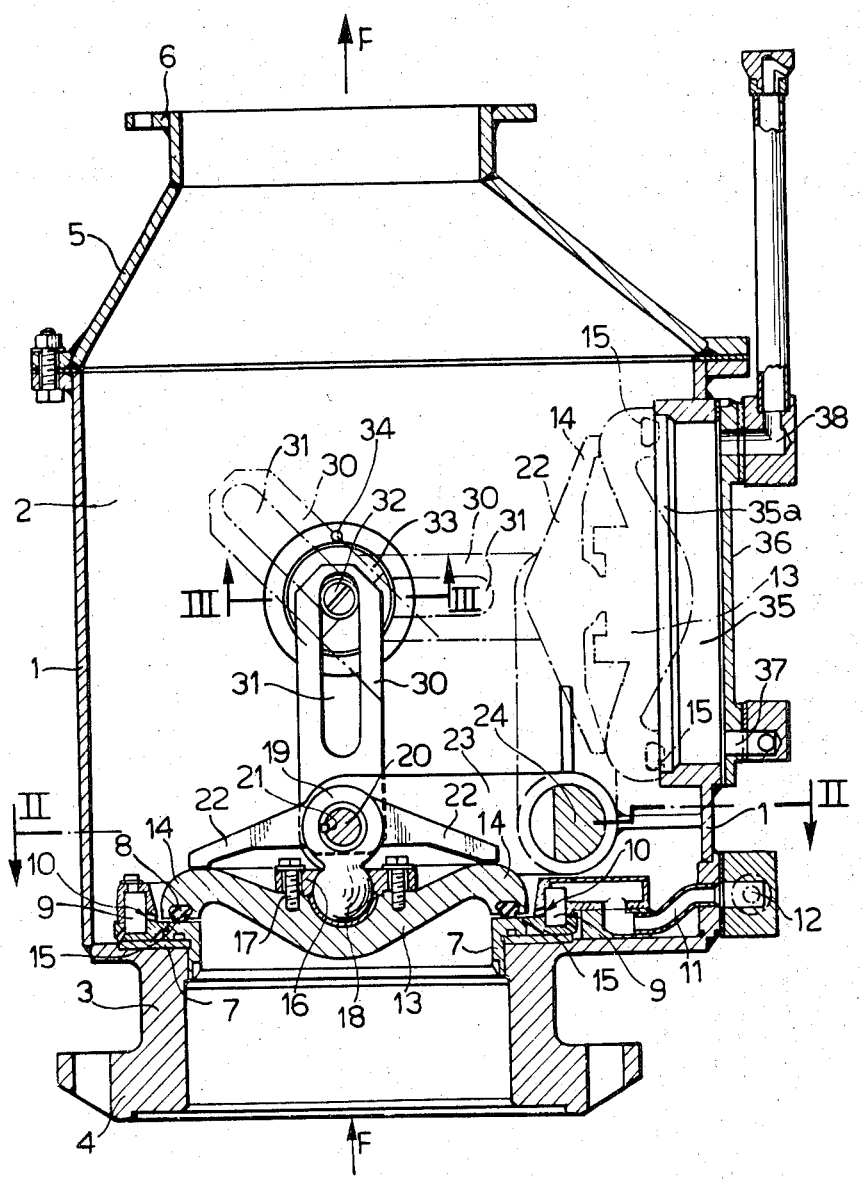
FIG. 1 is an axial sectional view of the embodiment.
Figure 2:
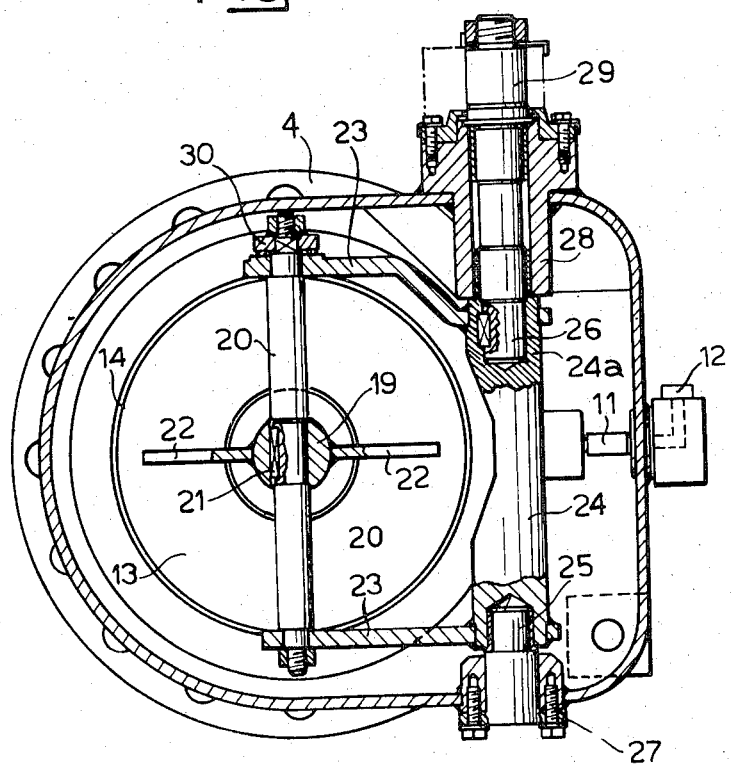
FIG. 2 is a cross sectional view of the embodiment taken on the line II—II of FIG. 1.

With reference to the drawings, the valve shown comprises a substantially cylindrical casing 1, defining a chamber 2 and provided with a lower port 3 surrounded by a coupling flange 4 and an upper port 5 surrounded by a coupling flange 6. The flange 4 of the port 3 is connected to the exhaust manifold of an internal combustion engine (not shown). To the flange 6 of the port 5 there is connected the exhaust pipe forming the remainder of the exhaust passage of the engine. The exhaust gases therefore flow in the direction shown by the arrows F.

To the inlet port 3, at a position within the chamber 2, there is arranged a fixed valve seat 7 which provides an annular valve face 8. Around the valve seat 7 there is arranged, in a known manner, an annular conduit 9 in which there are formed a number of nozzles 10 which are directed towards the annular support face 8. The annular conduit 9 is fed with water through a pipe 11 via a connector 12, and the water, which is sprayed from the nozzles 10, keeps the support face 8 cool and free from any deposits of incombustible particles or other impurities left behind by the exhaust gases which pass through the valve.

The movable part of the valve comprises a shutter plate 13, which is provided with an annular sealing ring 15 at the rim thereof. The shutter plate 13 rests, in the closed position, with the sealing ring 15 pressed by the rim of the plate 13, into engagement with the annular support face 8. The shutter plate 13 is connected by a plate 16 and screws 17 to a spherical end 18 of a lateral projection of a collar 19 which is mounted on the pivot 20 to which it is locked by a key 21. The collar 19 is also provided with lateral arms 22 which rest loosely against the periphery of the shutter plate 13.

The shaft 20 is mounted at its ends to the ends of respective arms 23 which are fixed at their other ends to a connecting element 24 mounted rotatably on pivot pins 25 and 26. The pivot pin 25 is fixed and is mounted by means of screws 27 on the wall of the housing 1 of the valve; the pivot pin 26 is keyed to the end 24a of the connecting element 24 so as to be able to transmit rotation movements thereto. The pivot pin 26 passes through a hollow bush 28, which is also fixed to the wall of the valve housing 1, and one end 29 of the pivot pin 26 projects from the bush to form a coupling to driving means for effecting rotation of the connecting element 24 to cause opening or closing of the valve shutter plate 13 as required.

Figure 3:
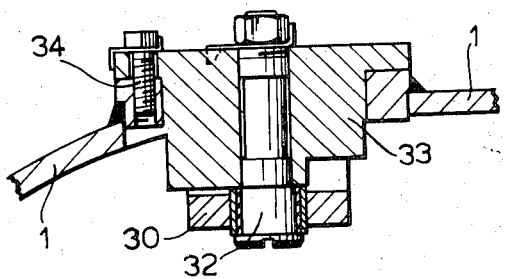
FIG. 3 is a sectional view, on an enlarged scale, taken on the line III—III of FIG. 1.

To the shaft 20 there is fixed a plate 30 having an elongate slot 31. The plate 30 is secured at one end to the shaft 20 in such a manner that the longitudinal axis of the slot 31 is substantially perpendicular to the plane of the shutter plate 13. The slot 31 of each plate 30 engages with a respective shaft 32 mounted on a support 33 (see particularly FIG. 3) which is attached, by screws 34, to the wall 1 of the valve housing 1.

With particular reference to FIG. 1, it will be seen that the wall of the valve housing 1 is provided with a short cylindrical recess 35 the axis of which extends transverse the general axis of the cylindrical housing 1, the recess 35 is closed at one end by a circular base wall 36 and open towards the chamber 2 within which the valve shutter 13 moves during the opening and closing of the valve. The recess 35 is furnished with an input conduit 37 and an output conduit 38 by means of which water can be passed and drawn from the recess 35 as will be described in greater detail below.

The diameter of the recess 35 is slightly greater than the outer diameter of the sealing ring 15, but is substantially less than the outer diameter of the valve shutter 13. When the valve is open, the valve shutter 13, as shown in broken outline in FIG. 1, is moved to a position where it closes the recess 35 to form a closed chamber in such a manner that the sealing ring 15 lies within the chamber 35 and can be continually washed over and cooled by a water circulated through the chamber via the inlet and outlet conduits 37 and 38 respectively.

From what has been described above, it will be appreciated that as the valve is opened the valve shutter 13 is raised from the fixed valve seat 7 by rotation of the support element 24 under the control of driving means (not shown) which act on the end 29 of the pivot pin 26. Raising of the shutter plate 13 is effected by rotation of the arms 23 the ends of which carry the ends of the shaft 20, to which the centre of the shutter plate 13 is secured by the ball and socket coupling on the collar 19. During opening of the valve and rotation of the arms 23 the elongate slot 31 of the plate 30 slides over the fixed pivot pin 32.

Since the plate 30 is rigidly connected to the shaft 20, the engagement between the slot 31 in the plate 30 and the fixed pivot 32 cause the valve shutter plate 13 to rotate around the shaft 20 until it is facing the recess 35 when the arms 23 have been rotated through about 90°. The valve shutter plate 13 is thus pressed against the cylindrical recess 35 to close the recess 35 and form a chamber therewith. The sealing ring 15 is located entirely within the chamber thus formed. It will thus be appreciated that, during operation of the engine, when the exhaust gases pass through the chamber 2, not only is the valve seat 7 constantly irrigated by water which emerges from the nozzles 10, so as to be cooled and kept clean, but also the sealing ring 15 of the valve shutter plate 13 is subjected to a similar cooling and washing treatment by water which is passed through the chamber 35.

Thus, potential damage due to overheating or deposits of solids on the cooperating parts of the valve is avoided.

The materials and the dimensions of the valve may be varied as desired and according to necessity without thereby departing from the scope of the present invention as above described and claimed hereinafter.

I claim:

1. In a valve for sealing the exhaust passage of an internal combustion engine, of the type comprising:
    a valve body,
    an inlet port to said valve body, said valve body being adapted to be mounted with said inlet port coupled to receive exhaust gases from said exhaust passageway,
    a fixed annular valve seat surrounding said inlet port,
    a valve shutter plate cooperating with said fixed annular valve seat,
    pivoted support arm means carrying said valve shutter plate, said pivoted support arm means being rotatably between a first position where said valve shutter plate engages said annular valve seat to close said valve, and a second position spaced by about 90° from said first position to move said valve shutter plate away from said annular valve seat to open said valve,
    the improvement comprising,
    said valve shutter plate being rotatably mounted at the end of said pivoted support arm means,
    a fixed element, and
    means associated with said valve shutter plate for cooperating with said fixed element to cause said valve shutter plate to rotate through about 180° with respect to said support arm means as said support arm means rotates from one of said first and second positions to the other.

2. The exhaust passageway sealing valve of claim 1 wherein said valve body further comprises:
    a substantially cylindrical recess in one wall thereof, the axis of said recess being substantially perpendicular to the axis of said valve body and said recess being located in such a position that it is closed by said valve shutter plate when said support arm means are in said second position thereby to form a cylindrical chamber, and
    inlet port means and outlet port means in said recess whereby cooling fluid can be circulated therethrough when said recess is closed by said valve shutter plate.

3. The valve of claim 2 wherein said valve shutter plate is provided with a sealing ring on the face thereof which engages said fixed annular valve seat and said cylindrical recess, the diameter of said cylindrical recess being greater than or equal to the outer diameter of said sealing ring, but less than the outer diameter of said valve shutter plate.

4. The valve of claim 1 wherein said means associated with said valve shutter plate for cooperating with said fixed element to cause said valve shutter plate to rotate through about 180° with respect to said support arm means as said support arm means moves from one of said first and second positions to the other comprises:
    at least one plate associated with said valve shutter plate, said at least one plate having an elongate slot therein the axis of which extends substantially perpendicular to the plane of said valve shutter plate, and
    a fixed pivot pin engaged in said elongate slot of said at least one plate and allowing said at least one plate to slide with respect thereto.

* * * * *